United States Patent
Sinka et al.

(10) Patent No.: US 10,052,913 B2
(45) Date of Patent: Aug. 21, 2018

(54) WHEEL END ASSEMBLY HAVING A SEAL INTERFACE WITH A TONE RING

(71) Applicant: ArvinMeritor Technology, LLC, Troy, MI (US)

(72) Inventors: Aaron Sinka, Rochester Hills, MI (US); Kou Yang, Warren, MI (US); James Hamblin, Westland, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 15/346,792

(22) Filed: Nov. 9, 2016

(65) Prior Publication Data

US 2018/0126782 A1 May 10, 2018

(51) Int. Cl.
| | | |
|---|---|---|
| *B60B 27/02* | (2006.01) | |
| *B60B 27/00* | (2006.01) | |
| *G01P 3/44* | (2006.01) | |
| *F16J 15/326* | (2016.01) | |
| *B62D 7/18* | (2006.01) | |
| *F16D 66/00* | (2006.01) | |

(52) U.S. Cl.
CPC .......... *B60B 27/02* (2013.01); *B60B 27/0052* (2013.01); *B60B 27/0073* (2013.01); *F16J 15/326* (2013.01); *G01P 3/443* (2013.01); *B62D 7/18* (2013.01); *F16D 66/00* (2013.01)

(58) Field of Classification Search
CPC . B60B 27/00; B60B 27/0052; B60B 27/0073; B60B 27/02; F16C 41/007; G01P 3/487; G01P 3/443; F16J 15/326
See application file for complete search history.

(56) References Cited

U.S. PATENT DOCUMENTS

| | | | |
|---|---|---|---|
| 4,161,120 A * | 7/1979 | Cloarec | G01P 3/443 324/173 |
| 4,705,090 A | 11/1987 | Bartos | |
| 4,730,656 A | 3/1988 | Goodell et al. | |
| 4,733,707 A | 3/1988 | Goodell et al. | |
| 4,946,296 A * | 8/1990 | Olschewski | F16C 41/007 340/682 |
| 5,031,967 A * | 7/1991 | Svensson | B60B 27/001 301/105.1 |
| 5,174,839 A | 12/1992 | Schultz et al. | |
| 5,354,391 A | 10/1994 | Goodell et al. | |
| 5,476,272 A * | 12/1995 | Hixson, II | B60T 8/171 277/317 |

(Continued)

FOREIGN PATENT DOCUMENTS

| | | |
|---|---|---|
| DE | 102014106519 A1 | 11/2015 |
| EP | 0822413 A2 | 2/1998 |

(Continued)

OTHER PUBLICATIONS

European Patent Office, Extended European Search Report for the corresponding European Patent Application No. 17195400.1 dated Jan. 16, 2018.

*Primary Examiner* — Kip T Kotter
(74) *Attorney, Agent, or Firm* — Brooks Kushman P.C.

(57) ABSTRACT

A wheel end assembly that has a spindle, a hub, a tone ring, and a seal assembly. The tone ring may be mounted to the hub and may have a tone ring opening that may extend around the spindle. The seal assembly may be disposed in the tone ring opening and may extend from the spindle to the tone ring.

20 Claims, 5 Drawing Sheets

(56) References Cited

U.S. PATENT DOCUMENTS

| | | | |
|---|---|---|---|
| 5,695,289 A * | 12/1997 | Ouchi | F16C 19/185 324/174 |
| 5,893,648 A | 4/1999 | Smith | |
| 6,145,558 A | 11/2000 | Schmitz | |
| 6,186,667 B1 * | 2/2001 | Nakamura | F16C 19/185 324/207.25 |
| 6,217,220 B1 | 4/2001 | Ohkuma et al. | |
| 6,363,985 B1 | 4/2002 | Beesley | |
| 6,457,869 B1 * | 10/2002 | Smith | B60B 27/001 384/448 |
| 6,719,028 B2 | 4/2004 | D'Amico et al. | |
| 6,994,136 B2 | 2/2006 | Stanczak | |
| 7,455,459 B2 * | 11/2008 | Toth | F16C 33/76 324/174 |
| 7,690,412 B1 | 4/2010 | Jenkinson et al. | |
| 7,931,061 B2 | 4/2011 | Gonska et al. | |
| 8,020,676 B2 * | 9/2011 | Bradley | F16D 66/00 188/18 A |
| 8,616,254 B2 | 12/2013 | Kelley et al. | |
| 8,915,274 B2 | 12/2014 | Eschenburg et al. | |
| 9,261,144 B2 * | 2/2016 | Duch | F16C 33/7823 |
| 2007/0211974 A1 * | 9/2007 | Toth | F16C 33/76 384/448 |
| 2011/0133046 A1 | 6/2011 | Lemerise et al. | |
| 2012/0186714 A1 | 7/2012 | Richardson | |
| 2012/0234447 A1 | 9/2012 | Narloch et al. | |
| 2014/0239597 A1 * | 8/2014 | White | B60B 27/0073 277/352 |
| 2015/0101722 A1 | 4/2015 | Lakin et al. | |
| 2015/0107742 A1 * | 4/2015 | Knapke | B60C 23/003 152/416 |
| 2016/0059626 A1 * | 3/2016 | Gemello | F16C 33/723 384/448 |
| 2016/0318359 A1 | 11/2016 | Knapke et al. | |

FOREIGN PATENT DOCUMENTS

| | | | |
|---|---|---|---|
| EP | 2980432 A1 | 2/2016 | |
| JP | 2004169925 A * | 6/2004 | F16C 33/7879 |

* cited by examiner

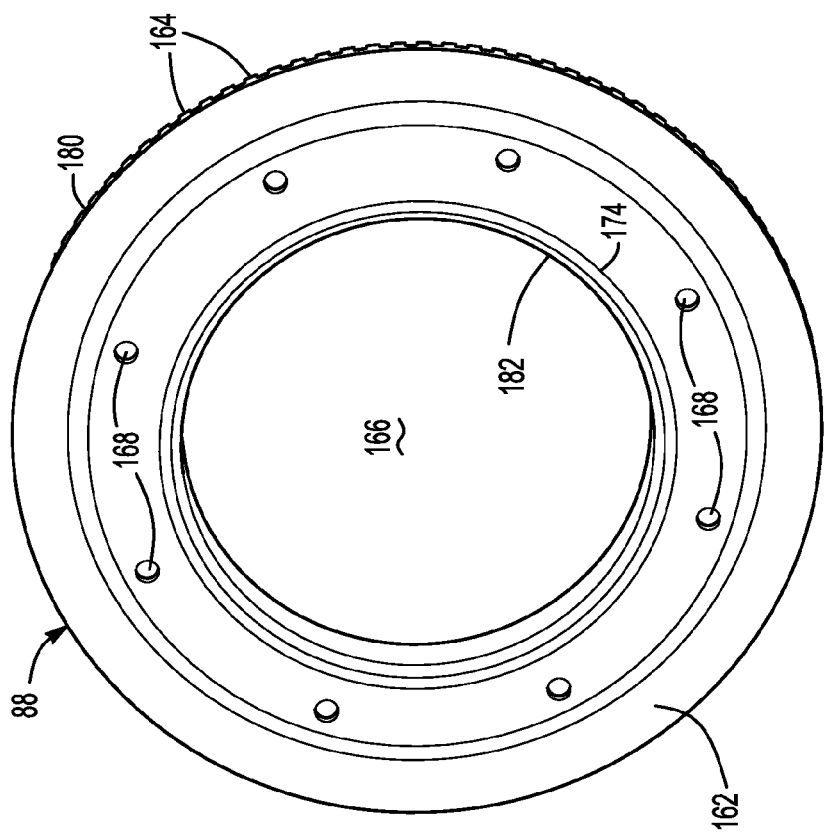
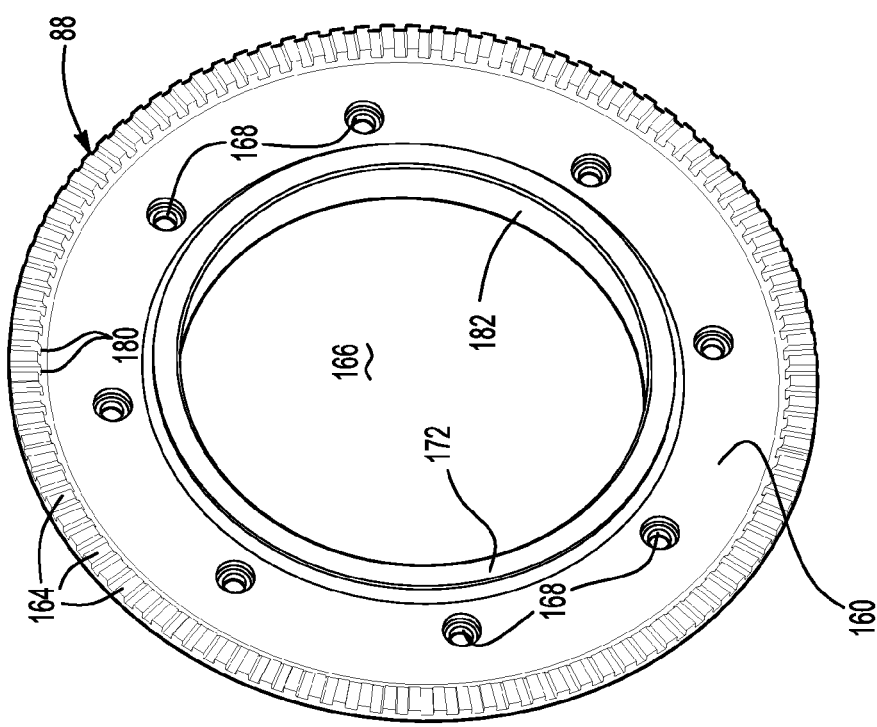

WHEEL END ASSEMBLY HAVING A SEAL INTERFACE WITH A TONE RING

TECHNICAL FIELD

This disclosure relates to the wheel end assembly that has a seal that interfaces with a tone ring.

BACKGROUND

An axle assembly that has a wheel end seal assembly and a tone ring is disclosed in U.S. Patent Publication No. 2015/0101722.

SUMMARY

In at least one embodiment, a wheel end assembly is provided. The wheel end assembly may have a spindle, a hub, a tone ring, and a seal. The hub may be rotatably disposed on the spindle. The tone ring may be fixedly mounted to the hub. The tone ring may have a tone ring opening that may extend around the spindle. The seal may be disposed in the tone ring opening and may extend from the spindle to the tone ring.

In at least one embodiment, a wheel end assembly is provided. The wheel end assembly may include a spindle, a hub, a tone ring, and a seal. The spindle may extend around an axis. The hub may receive the spindle and may be rotatable about the axis with respect to the spindle. The tone ring may be fixedly mounted on the hub. The tone ring may have a tone ring opening that may receive the spindle. The seal may be disposed in the tone ring opening. The seal may extend from the spindle to the tone ring. The seal may be spaced apart from and may not engage the hub.

BRIEF DESCRIPTION OF THE DRAWINGS

FIGS. 5 and 6 are perspective views of a tone ring and a seal that may be provided with the wheel end assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
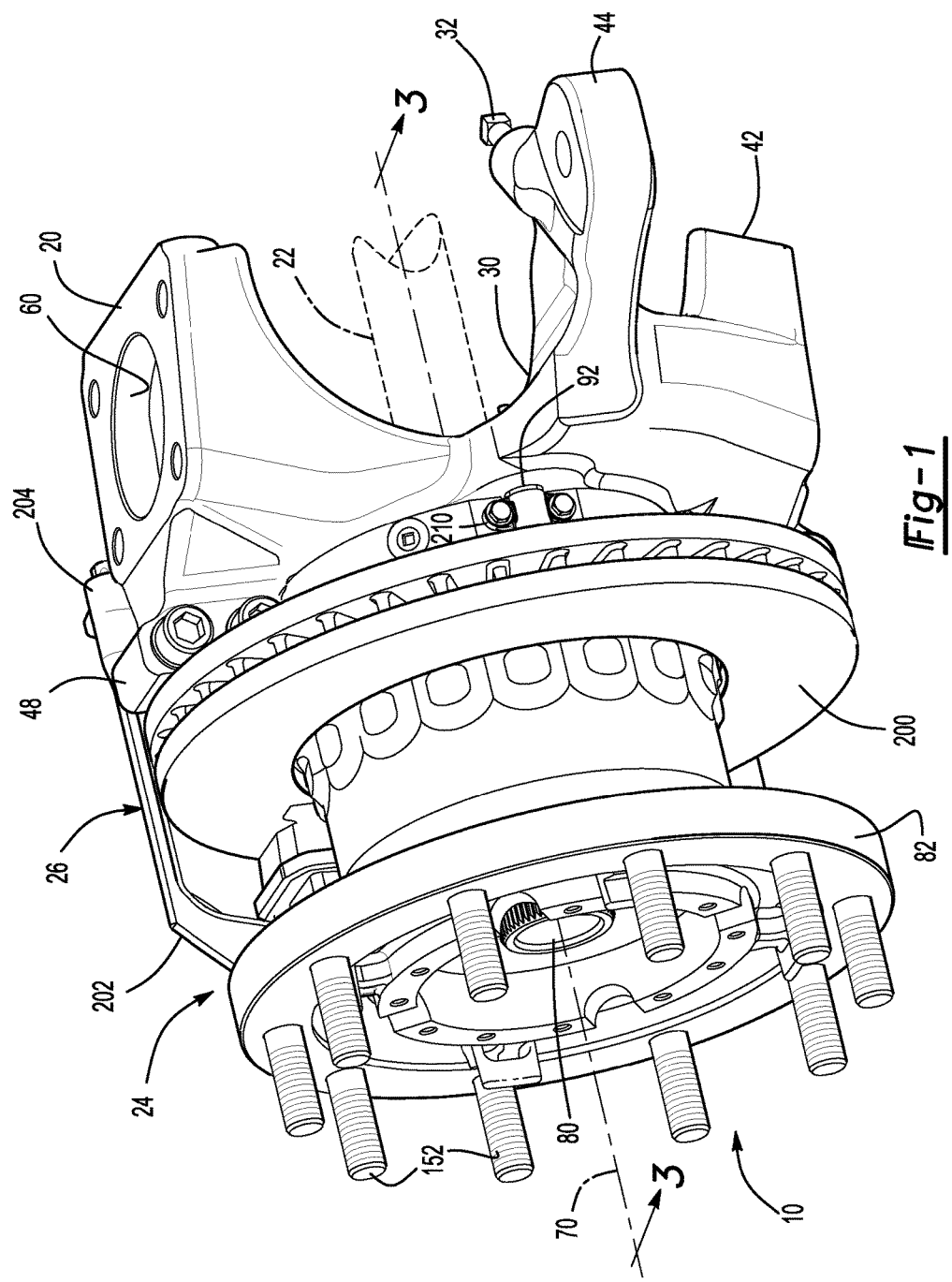
FIG. 1 is a perspective view that shows a wheel end assembly.

Referring to FIG. 1, a portion of an axle assembly 10 is shown. The axle assembly 10 may be provided with a motor vehicle like a truck, bus, farm equipment, military transport or weaponry vehicle, or cargo loading equipment for land, air, or marine vessels or a trailer that may be provided with a motor vehicle.

The axle assembly 10 may be configured as a drive axle that may receive torque from a power source, such as an internal combustion engine or electric motor. Alternatively, the axle assembly 10 may be configured as a non-drive axle in one or more embodiments. In a drive axle configuration, the axle assembly 10 may include a support member 20, an axle shaft 22, a wheel end assembly 24, and a brake subsystem 26. The axle shaft 22 may be omitted in a non-drive axle configuration.

The support member 20 may facilitate mounting of the axle assembly 10 to the vehicle. In FIG. 1, the support member 20 is configured as a steering knuckle that may be pivotally disposed on the axle assembly 10; however, it is contemplated that the support member 20 may associated with a non-steerable axle assembly. For example, the steering knuckle may be omitted on a non-steerable axle assembly and the support member 20 may be an axle housing of the axle assembly 10. The support member 20 that is configured as a steering knuckle will primarily be discussed below.

The steering knuckle may be part of a steering system that may be used to steer or change the direction of the vehicle. Moreover, the steering knuckle may interconnect a vehicle wheel to a structural member or suspension member of the vehicle, such as an axle beam, control arm, or other linkage. In at least one embodiment, the steering knuckle may include a steering knuckle body 30 and a stop bolt assembly 32.

Figure 2:
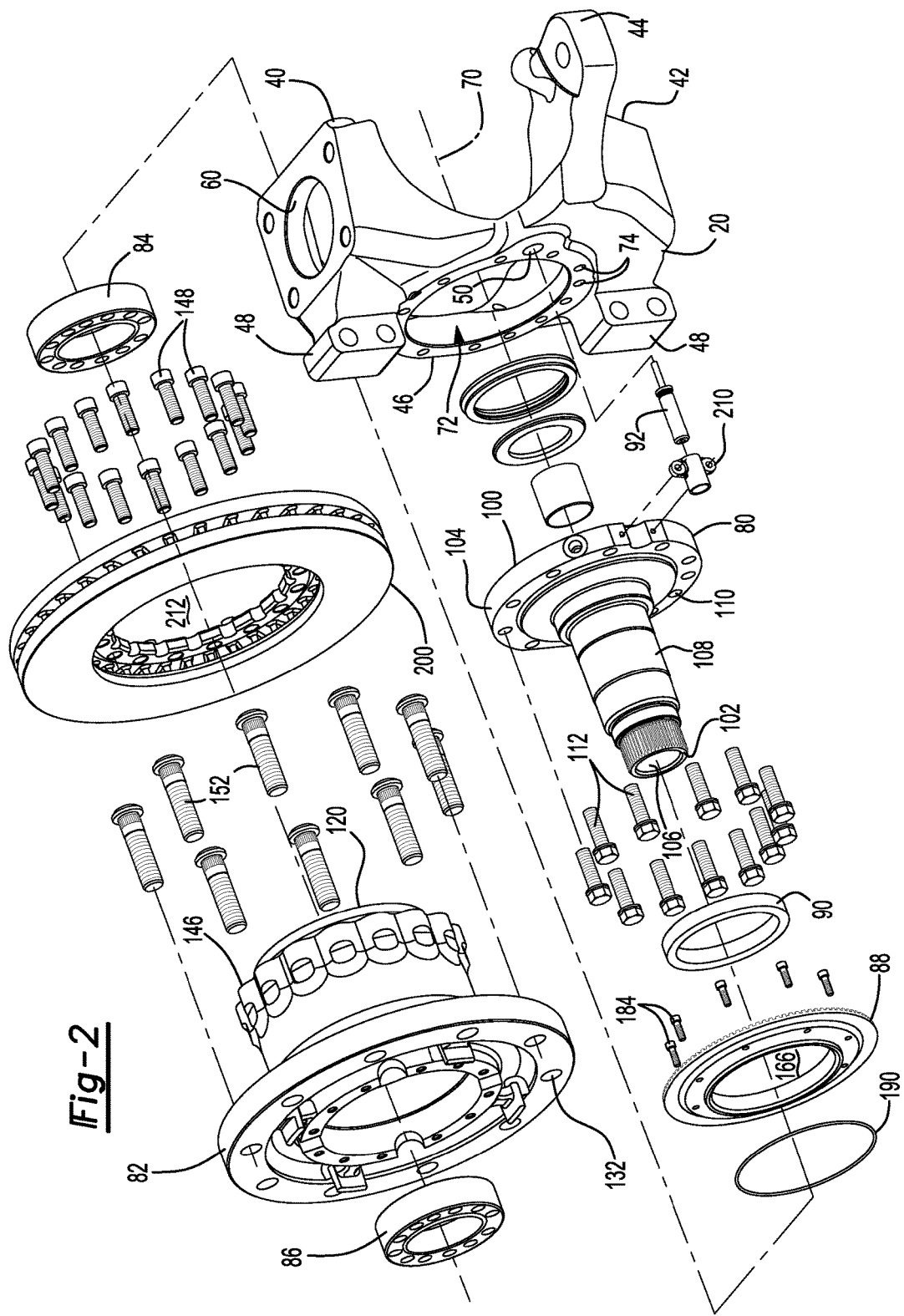
FIG. 2 is an exploded view of a portion of the wheel end assembly.

Referring to FIG. 2, the steering knuckle body 30 may facilitate mounting of various components to the steering knuckle. In at least one embodiment, the steering knuckle body 30 may include a first arm 40, a second arm 42, a tie rod arm 44, a spindle mounting surface 46, one or more brake mounts 48, and a tone ring sensor opening 50.

The first arm 40 may be disposed near the top of the steering knuckle body 30 and may extend away from a brake mount 48. The first arm 40 may include a kingpin hole 60 that may receive a kingpin that may couple the steering knuckle to another vehicle component, such as an axle beam or linkage, such that the steering knuckle may pivot about the kingpin. The kingpin hole 60 may be a through hole that may extend through the first arm 40.

Figure 3:
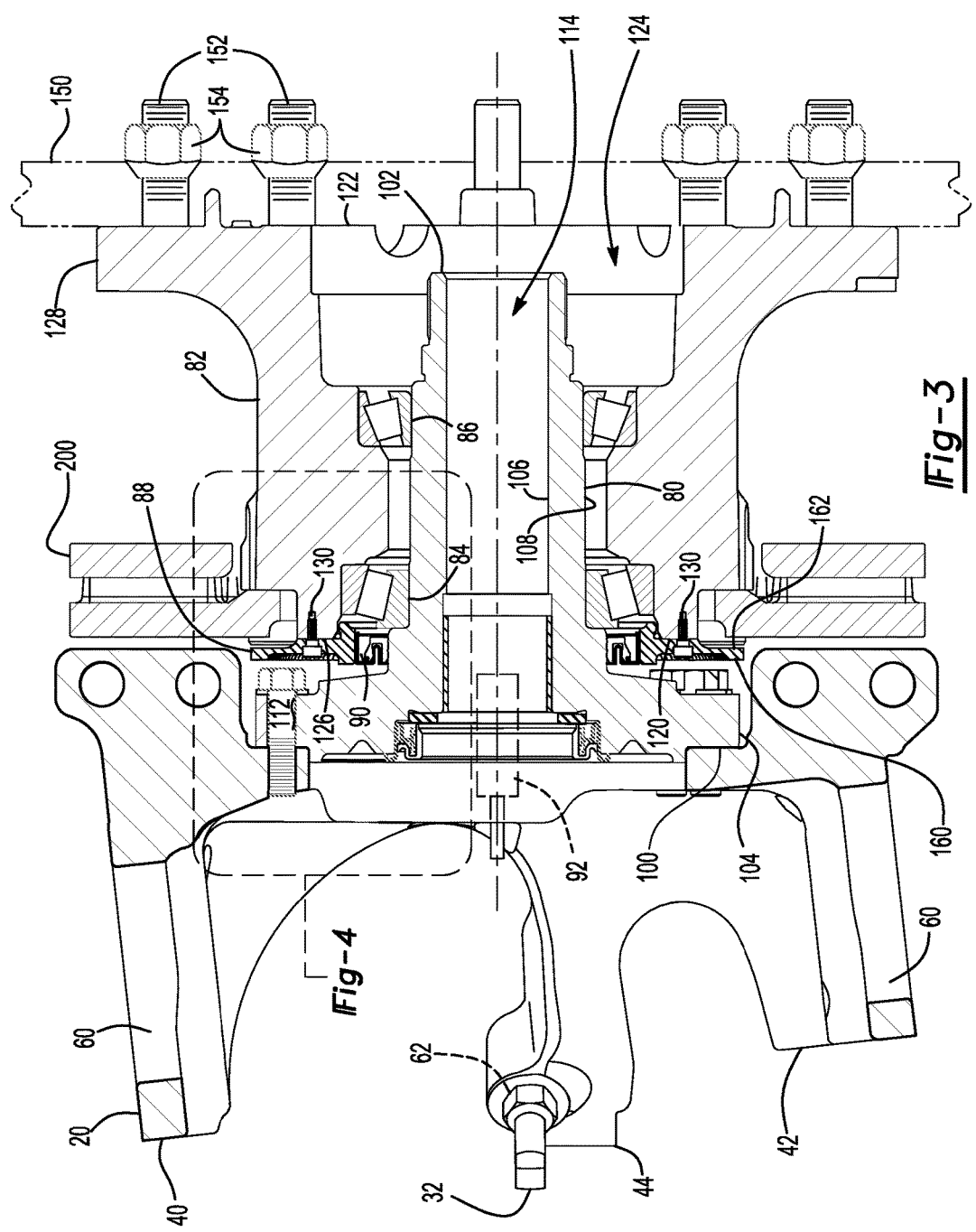
FIG. 3 is a section view along section line 3-3.

The second arm 42 may be disposed near the bottom of the steering knuckle body 30 and may extend away from another brake mount 48. The second arm 42 may also include a kingpin hole 60 that may receive the kingpin as is best shown in FIG. 3.

The tie rod arm 44 may be disposed between the first arm 40 and the second arm 42. The tie rod arm 44 may transmit force from a steering linkage, such as a tie rod, to the steering knuckle to help rotate the steering knuckle about the kingpin to steer the vehicle. In FIG. 2, the tie rod arm 44 is integrally formed with the steering knuckle body 30; however it is contemplated that the tie rod arm 44 may be provided as a separate component from the steering knuckle body 30. In at least one configuration such as is shown in FIG. 3, the tie rod arm 44 may include a stop bolt mounting hole 62 that may facilitate mounting of the stop bolt assembly 32.

Referring to FIG. 2, the spindle mounting surface 46 may extend around an axis 70 and/or an opening 72 in the steering knuckle. A set of spindle mounting holes 74 may be provided in the spindle mounting surface 46. The spindle mounting holes 74 may be spaced apart from each other and may be radially disposed about the axis 70. In addition, the spindle mounting holes 74 may be threaded.

One or more brake mounts 48 may be provided to facilitate mounting of a brake subsystem 26 to the steering knuckle. For example, the brake mounts 48 may facilitate mounting of a brake caliper to the steering knuckle. The brake mounts 48 may extend away from the first and second arms 40, 42, respectively, and may be arranged around the opening 72 in the steering knuckle body 30. In FIG. 2, the brake mounts 48 are integrally formed with the steering knuckle body 30; however it is contemplated that the brake mounts 48 may be provided as separate components from the steering knuckle body 30.

The tone ring sensor opening 50, if provided, may receive a tone ring sensor that may detect rotation of a wheel as will be discussed in more detail below. The tone ring sensor opening 50 may be disposed proximate the opening 72 and the steering knuckle and may extend through the spindle mounting surface 46.

Referring to FIGS. 2 and 3, the stop bolt assembly 32 may be mounted to the steering knuckle. For example, the stop bolt assembly 32 may be received in the stop bolt mounting hole 62 of the tie rod arm 44. The stop bolt assembly 32 may be an adjustable mechanical stop that may control the maximum turn angle of the steering knuckle about the kingpin or a kingpin axis. The maximum turn angle may be measured with respect to a nominal steering knuckle rotational position or a position in which the steering knuckle may be disposed when the vehicle is traveling straight and not turning. A tire associated with the steering knuckle may not rub against the frame or other vehicle components when the stop bolt assembly 32 is properly adjusted.

Referring to FIG. 1, the axle shaft 22 may provide torque to the wheel end assembly 24 to propel the vehicle. For instance, the axle shaft 22 may be operatively connected at a first end to a vehicle drivetrain component, like a differential or input shaft, and may be coupled to the wheel end assembly 24 at a second end. In at least one embodiment, the axle shaft 22 may extend along and may rotate about the axis 70. Alternatively, the axle shaft 22 may be configured for use with an independent suspension system and may have multiple shaft segments and/or joints, such as constant-velocity joints, that may facilitate relative movement between the first end of the axle shaft 22 and the wheel end assembly 24. The axle shaft 22 may be directly or indirectly coupled to a hub of the wheel end assembly 24. For instance, the axle shaft 22 may include an axle flange that may be disposed at a distal end of the axle shaft 22 and that may be fastened to a hub. Alternatively, the axle shaft 22 may be indirectly coupled to the hub, such as via a gear reduction unit that may be provided with the wheel end assembly 24.

The wheel end assembly 24 may facilitate mounting and rotation of a vehicle wheel. As is best shown with reference to FIG. 2, the wheel end assembly 24 may include a spindle 80, a hub 82, a first wheel bearing 84, a second wheel bearing 86, a tone ring 88, a seal 90, and a tone ring sensor 92.

Referring to FIGS. 2 and 3, the spindle 80 may rotatably support the hub 82. For example, the spindle 80 may support the first wheel bearing 84 and the second wheel bearing 86, which in turn may support and facilitate rotation of the hub 82 and an associated vehicle wheel. In addition, the spindle 80 may extend along or may extend around the axis 70.

The spindle 80 may be fixedly positioned with respect to the support member 20. As such, the spindle 80 may not rotate about the axis 70. For instance, the spindle 80 may be integrally formed with the support member 20 or may be a separate component that may be fixedly mounted to the support member 20. In the configuration shown, the spindle 80 is separate from the steering knuckle and may include a first spindle end surface 100, a second spindle end surface 102, a spindle mounting flange 104, an internal surface 106, and an external surface 108.

The first spindle end surface 100 may be disposed proximate or may engage the support member 20 in configurations where the spindle 80 is a separate component from the support member 20. For instance, the first spindle end surface 100 may be disposed on and may engage the spindle mounting surface 46 of the support member 20. The first spindle end surface 100 may be omitted in configurations where the spindle 80 is integrally formed with the support member 20.

The second spindle end surface 102 may be disposed opposite the first spindle end surface 100. The second spindle end surface 102 may be disposed at a free end or distal end of the spindle 80.

The spindle mounting flange 104 may extend from the first spindle end surface 100 toward the second spindle end surface 102. The spindle mounting flange 104 may extend outwardly away from the axis 70 and may facilitate mounting of the spindle 80 to the support member 20. For example, the spindle mounting flange 104 may include a plurality of mounting flange holes 110 that may extend through the spindle mounting flange 104. The mounting flange holes 110 may be arranged around the axis 70 and may be disposed between an outside circumference of the spindle mounting flange 104 and the internal surface 106. Each mounting flange hole 110 may receive a corresponding fastener 112, such as a bolt, that may couple the spindle 80 to the support member 20. Each fastener 112 may be received in a corresponding spindle mounting hole 74 of the support member 20.

The internal surface 106 may extend between the first spindle end surface 100 and the second spindle end surface 102. As is best shown in FIG. 3, the internal surface 106 may at least partially define a spindle hole 114. The axle shaft 22 may extend through the spindle hole 114. The internal surface 106 and the spindle hole 114 may be omitted in a non-drive axle configuration.

The external surface 108 may be disposed opposite the internal surface 106. The external surface 108 may support the first wheel bearing 84 and the second wheel bearing 86 as will be discussed in more detail below.

Referring to FIGS. 2 and 3, the hub 82 may be rotatably disposed on the spindle 80. As such, the hub 82 may be configured to rotate about the axis 70. In a drive axle configuration, the hub 82 may be operatively connected to the axle shaft 22. As is best shown in FIG. 3, the hub 82 may have a first hub end surface 120, a second hub end surface 122, a hub cavity 124, a first hub mounting flange 126, and a second hub mounting flange 128.

The first hub end surface 120 may face toward the support member 20. In addition, the first hub end surface 120 may extend around the axis 70 and may generally extend around the tone ring 88. The first hub end surface 120 may include a plurality of tone ring fastener holes 130. The tone ring fastener holes 130 may be arranged around the axis 70 and may be provided in the first hub mounting flange 126.

The second hub end surface 122 may be disposed opposite the first hub end surface 120. As is best shown in FIG. 2, the second hub end surface 122 may include a plurality of mounting lug fastener holes 132. The mounting lug fastener holes 132 may be arranged around the axis 70 and may be provided in the second hub mounting flange 128.

Referring to FIG. 3, the hub cavity 124 may extend from the first hub end surface 120 to the second hub end surface 122. The hub cavity 124 may receive at least a portion of various components of the axle assembly 10, such as the axle shaft 22, spindle 80, first wheel bearing 84, and the second wheel bearing 86.

Figure 4:
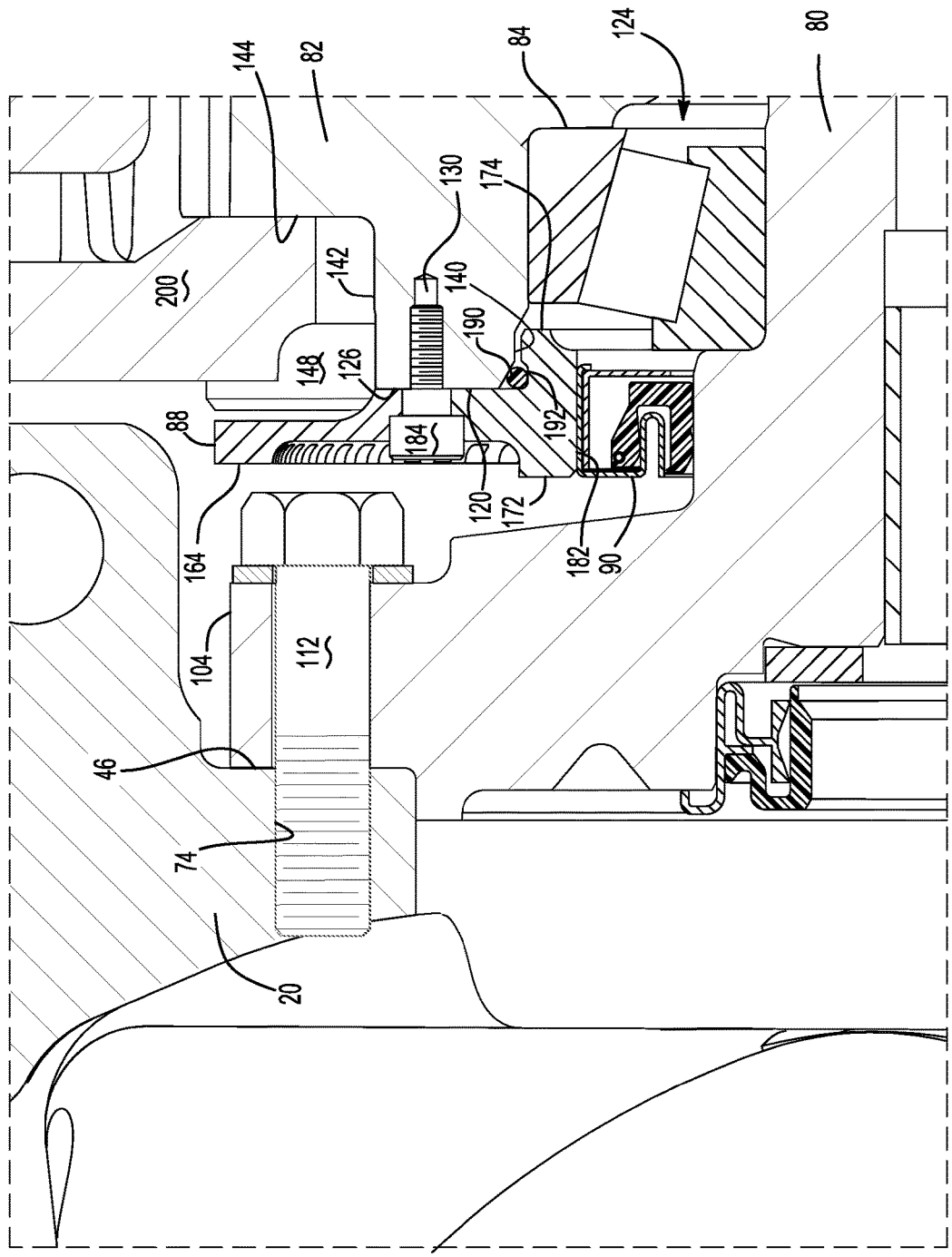
FIG. 4 is a magnified view of a portion of the wheel end assembly that is shown in FIG. 3.

Referring to FIG. 4, the first hub mounting flange 126 may extend toward the spindle 80 and the spindle mounting flange 104. The first hub mounting flange 126 may facilitate mounting of the tone ring 88 and may support a brake rotor of the brake subsystem 26. The first hub mounting flange 126 may have an inner side 140 and an outer side 142.

The inner side 140 may face toward the axis 70 and the spindle 80. In at least one configuration, the inner side 140 or a portion thereof may be radially disposed with respect to the axis 70. The inner side 140 may extend around the first wheel bearing 84 and may extend around a portion of the tone ring 88 as will be discussed in more detail below.

The outer side 142 may be disposed opposite the inner side 140. As such, the outer side 142 may face away from the axis 70 and the spindle 80. In at least one configuration, the outer side 142 may be radially disposed with respect to the axis 70. The outer side 142 may be disposed proximate and may engage a brake rotor as will be discussed in more detail below. The first hub end surface 120 may extend between the inner side 140 and the outer side 142 in one or more embodiments.

The step surface 144 may extend from the first hub mounting flange 126. For instance, the step surface 144 may extend from an end of the outer side 142 in a direction that extends away from the axis 70. The plurality of brake rotor fastener holes 146, which are best shown in FIG. 2, may be provided in the step surface 144. The brake rotor fastener holes 146 may be arranged around the axis 70 and may positioned opposite the tone ring 88. The brake rotor fastener holes 146 may each receive a brake rotor fastener 148, such as a bolt, that may couple a brake rotor to the hub 82.

Referring to FIG. 3, the second hub mounting flange 128 may be disposed opposite the first hub mounting flange 126. The second hub mounting flange 128 may extend away from the axis 70. For instance, the second hub mounting flange 128 may extend substantially perpendicular to the axis 70 in one or more embodiments. The second hub mounting flange 128 may facilitate mounting of a wheel 150 that may support a tire. For example, the second hub mounting flange 128 may include the mounting lug fastener holes 132 while the wheel 150 may have a wheel mounting flange that may have a set of holes that may each receive a corresponding fastener 152, such as a wheel mounting lug or wheel mounting bolt. A lug nut 154 may be threaded onto each fastener 152 to secure the wheel 150 to the hub 82.

Referring to FIGS. 2 and 3, the first wheel bearing 84 may be disposed on the spindle 80 and may rotatably support the hub 82. For example, the first wheel bearing 84 may be disposed on and may extend around the external surface 108 of the spindle 80 and may be received in the hub cavity 124. The first wheel bearing 84 may be positioned closer to the first spindle end surface 100 and the tone ring 88 than the second wheel bearing 86. For example, the first wheel bearing 84 may be axially positioned between the tone ring 88 and the second wheel bearing 86.

The first wheel bearing 84 may have any suitable configuration. For instance, the first wheel bearing 84 may include a plurality of rolling elements, such as balls or rollers, that may be disposed between an inner race and an outer race. The inner race may be disposed on and may extend around the external surface 108 of the spindle 80. The outer race may be disposed on the hub 82 and may extend around the inner race. The outer race may be disposed on the inner side 140 of the first hub mounting flange 126. The first wheel bearing 84 may be larger than the second wheel bearing 86.

The second wheel bearing 86 may also be disposed on the spindle 80 and may rotatably support the hub 82. For example, the second wheel bearing 86 may be disposed on and may extend around the external surface 108 of the spindle 80 and may be received in the hub cavity 124. The second wheel bearing 86 may be positioned closer to the second spindle end surface 102 than the first wheel bearing 84. The second wheel bearing 86 may have any suitable configuration. For instance, the second wheel bearing 86 may include a plurality of rolling elements, such as balls or rollers, that may be disposed between an inner race and an outer race.

Referring to FIGS. 2 and 3, the tone ring 88 may be axially positioned between the support member 20 and the hub 82. The tone ring 88 may be fixedly mounted to the hub 82. As such, the tone ring 88 may rotate with the hub 82 about the axis 70. The tone ring 88 may extend continuously around the seal 90 and may inhibit leakage of lubricant or entry of contaminants between the tone ring 88 and the seal 90.

Referring to FIGS. 5 and 6, perspective views of the tone ring 88 are shown. The tone ring 88 may be configured as a ring and may have a first side 160, a second side 162, a set of tone ring teeth 164, a tone ring opening 166, one or more tone ring mounting holes 168 a first tone ring flange 172, and a second tone ring flange 174.

Referring to FIGS. 3 and 5, the first side 160 may face toward the support member 20 and the spindle 80 and may face away from the hub 82. The first side 160 or a portion thereof may be disposed substantially perpendicular to the axis 70 in one or more embodiments.

Referring to FIGS. 5 and 6, second side 162 may be disposed opposite the first side 160. As such, the second side 162 may face toward the hub 82. A portion of the second side 162 may be disposed proximate and may engage the hub 82. For example, the second side 162 may be disposed on the first hub mounting flange 126 and the first hub end surface 120.

Referring to FIG. 5, the set of tone ring teeth 164 may extend from the first side 160 of the tone ring 88. The tone ring teeth 164 may be arranged around the axis 70 in a repeating arrangement and may be disposed proximate or may extend from the outside circumference of the tone ring 88. The tone ring teeth 164 may extend along a radial line with respect to the axis 70. A gap 180 may be provided between adjacent tone ring teeth 164.

The tone ring opening 166 may extend from the first side 160 to the second side 162. The tone ring opening 166 may be at least partially defined by an inner tone ring surface 182. The inner tone ring surface may extend around the axis 70 and the spindle 80 and may be radially disposed with respect to the axis 70. The tone ring opening 166 may receive the seal 90 as will be discussed in more detail below.

One or more tone ring mounting holes 168 may be provided to facilitate coupling of the tone ring 88 to the hub 82. The tone ring mounting holes 168 may extend through the tone ring 88. The tone ring mounting holes 168 may be arranged around the axis 70 and may be disposed between the tone ring teeth 164 and the tone ring opening 166. As is best shown in FIGS. 2 and 4, the tone ring mounting hole 168 may receive a corresponding fastener 184, such as a bolt, that may couple the tone ring 88 to the hub 82. Each fastener 184 may be received in a corresponding tone ring fastener hole 130 of the hub 82.

Referring to FIGS. 4 and 5, the first tone ring flange 172 may extend toward the support member 20 and the spindle mounting flange 104 of the spindle 80. The first tone ring flange 172 may protrude from the first side 160 of the tone ring 88 and may at least partially define the tone ring opening 166. In at least one embodiment, the first tone ring flange 172 may extend continuously around the tone ring opening 166 and may engage the seal 90. In addition, the first tone ring flange 172 may extend further from the hub 82 and may be disposed closer to the spindle 80 than the tone ring teeth 164.

The second tone ring flange 174 may be disposed opposite the first tone ring flange 172. In addition, the second tone ring flange 174 may extend toward the first wheel bearing 84 and may be at least partially received in the hub cavity 124. As is best shown in FIG. 4, the second tone ring flange 174 may extend around a portion of the first wheel bearing 84 and may engage a portion of the seal 90. As such, the second tone ring flange 174 may be radially disposed between the hub 82 and a portion of the seal 90 that is received in or extends into the hub cavity 124. In addition, the second tone ring flange 174 may help secure a tone ring seal 190. For instance, a groove 192 may be provided with the second tone ring flange 174 and may receive tone ring seal 190.

Referring to FIGS. 2 and 4, the tone ring seal 190 may be disposed between the tone ring 88 and the hub 82. The tone ring seal 190 may have any suitable configuration. For example, the tone ring seal 190 may be configured as an O-ring. In at least one embodiment, the tone ring seal 190 may extend continuously around the second tone ring flange 174 and may be partially received in the groove 192 to help secure the tone ring seal 190 to the tone ring 88. The tone ring seal 190 may engage the hub 82. For example, the tone ring seal 190 may engage the inner side 140 of the first hub mounting flange 126. As is best shown in FIG. 4, the tone ring seal 190 may be positioned such that the tone ring seal 190 may be disposed opposite and may extend around a portion of the seal 90 while the hub 82, and more specifically the first hub mounting flange 126, may extend continuously around the tone ring seal 190. The tone ring seal 190 may extend continuously around the second tone ring flange 174 and the first wheel bearing 84.

Referring to FIGS. 2-5, the seal 90 may extend from the spindle 80 to the tone ring 88. For example, the seal 90 may extend continuously around the axis 70 and the spindle 80 and may be at least partially received in the tone ring opening 166. As is best shown in FIG. 4, the seal 90 may extend from the spindle 80 to the inner tone ring surface 182. The seal 90 may help inhibit lubricant from exiting the hub cavity 124 between the spindle 80 and the tone ring 88. In addition, the seal 90 may inhibit contaminants from entering the hub cavity 124. Providing a seal 90 that extends from the spindle 80 to the tone ring 88 may help reduce package space and may enable the use of a first wheel bearing 84 that is larger than the second wheel bearing 86, which in turn may help improve durability of the wheel end assembly 24.

Referring to FIG. 4, the seal 90 may be spaced apart from and may not engage the hub 82. In addition, the seal 90 may be axially disposed between the spindle mounting flange 104 and the first wheel bearing 84. The seal 90 may be spaced apart from and may not engage the spindle mounting flange 104, the first wheel bearing 84, or both in one or more embodiments. The seal 90 may be completely or partially disposed outside of the hub cavity 124. The seal 90 may also be axially positioned between the opposing ends of the first tone ring flange 172 and the second tone ring flange 174. In at least one embodiment, the seal 90 may be fixedly disposed with respect to the tone ring 88 and may rotate about the axis 70 and with respect to the spindle 80.

Referring to FIG. 1, the brake subsystem 26 may facilitate braking to slow rotation of the hub 82 and the wheel 150 about the axis 70. The brake subsystem 26 may have any suitable configuration. For instance, the brake subsystem 26 may be configured as a friction brake, such as a disc brake or a drum brake. In FIG. 1, a portion of the brake subsystem 26 is shown that has a disc brake configuration. In a disc brake configuration, the brake subsystem 26 may include components such as a brake rotor 200, a bridge 202, and a housing 204. These components are shown to facilitate an abbreviated discussion of the operation of the brake subsystem 26.

Referring to FIGS. 1 and 2, the brake rotor 200 may be fixedly disposed on the hub 82 by way of the brake rotor fasteners 148. As is best shown in FIG. 2, the brake rotor 200 may have a brake rotor opening 212 that may receive the hub 82. As is best shown in FIG. 4, the brake rotor 200 may be axially positioned such that the brake rotor 200 extends around the hub 82, first wheel bearing 84, and the second tone ring flange 174.

Referring to FIG. 1, the bridge 202 may generally extend around the brake rotor 200 and may be fixedly disposed on the housing 204. As such, the bridge 202 may move with the housing 204 with respect to a brake carrier (not shown) when the brake subsystem 26 is actuated.

The housing 204 may be moveably disposed on the brake carrier, which in turn may be fixedly mounted to a component of the axle assembly, such as the support member 20. For example, the housing 204 may slide on a pair of guide pins that may be fixedly disposed on the brake carrier. The housing 204 may receive an actuator that may actuate a pair of brake pad assemblies into engagement with the brake rotor 200. The brake pad assemblies may be received by the brake carrier and may engage opposite sides of the brake rotor 200 when actuated to slow rotation of an associated wheel 150.

Referring to FIGS. 1 and 2, the tone ring sensor 92 may be provided with an antilock brake system and may be configured to detect rotation of the hub 82 about the axis 70. More specifically, the tone ring sensor 92 may detect the presence or absence of the tone ring teeth 164 or the gaps 180 between the tone ring teeth 164 as the hub 82 rotates about the axis 70. As such, the tone ring sensor 92 may provide a corresponding signal that may be indicative of rotation of the hub 82 and wheel 150.

A tone ring sensor mounting bracket 210 may facilitate mounting of the tone ring sensor 92 to a component of the axle assembly 10 that does not rotate about the axis 70. For instance, the tone ring sensor mounting bracket 210 may be fixedly disposed on the support member 20 or the spindle 80. In at least one embodiment, the tone ring sensor mounting bracket 210 may include an aperture that may receive the tone ring sensor 92. The tone ring sensor mounting bracket 210 may be coupled to the spindle 80 in any suitable manner, such as with one or more fasteners.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wheel end assembly comprising:
   a spindle;
   a hub that is rotatably disposed on the spindle;
   a tone ring that is fixedly mounted to the hub and that has a tone ring opening that extends around the spindle, a first tone ring flange, and a second tone ring flange that is disposed opposite the first tone ring flange and extends toward a first wheel bearing;
   a tone ring seal that extends around the second tone ring flange and that extends from the second tone ring flange to the hub; and
   a seal that is disposed in the tone ring opening and that extends from the spindle to the first tone ring flange and the second tone ring flange.

2. The wheel end assembly of claim 1 wherein the seal is spaced apart from the hub.

3. The wheel end assembly of claim 1 wherein the seal is completely disposed in the tone ring opening.

4. The wheel end assembly of claim 1 wherein the hub extends continuously around at least a portion of the tone ring.

5. The wheel end assembly of claim 1 wherein the seal extends continuously around the spindle and the tone ring extends continuously around the seal.

6. The wheel end assembly of claim 5 wherein the spindle is disposed around an axis and has a spindle mounting flange that extends away from the axis and is mounted to a support member, wherein the seal is axially positioned between the spindle mounting flange and the first wheel bearing.

7. The wheel end assembly of claim 6 wherein the support member is a steering knuckle.

8. The wheel end assembly of claim 6 wherein the seal is spaced apart from and does not engage the spindle mounting flange and the first wheel bearing.

9. The wheel end assembly of claim 6 wherein the hub has a hub cavity that receives the spindle and the first wheel bearing, wherein at least a portion of the seal is disposed outside the hub cavity and is not received in the hub cavity.

10. The wheel end assembly of claim 9 wherein the tone ring is disposed between the hub and the seal and the seal is at least partially received in the hub cavity.

11. A wheel end assembly comprising:
    a spindle that extends around an axis;
    a hub that receives the spindle and is rotatable about the axis with respect to the spindle, wherein the hub has a hub cavity;
    a tone ring that is fixedly mounted on the hub and that has a tone ring opening that receives the spindle, a first tone ring flange that protrudes from a first side of the tone ring, and a second tone ring flange disposed opposite the first tone ring flange that protrudes from a second side of the tone ring that engages the hub and is disposed opposite the first side, wherein the second tone ring flange extends into the hub cavity; and
    a seal that is disposed in the tone ring opening and that extends from the spindle to the first tone ring flange and the second tone ring flange, wherein the seal is spaced apart from and does not engage the hub.

12. The wheel end assembly of claim 11 wherein the hub has a first hub end surface, a second hub end surface that is disposed opposite the first hub end surface, and the hub cavity extends from the first hub end surface to the second hub end surface, wherein the tone ring is coupled to the first hub end surface and is partially received in the hub cavity.

13. The wheel end assembly of claim 12 wherein the tone ring extends around and is spaced apart from first and second wheel bearings that rotatably support the hub.

14. The wheel end assembly of claim 12 wherein the second tone ring flange extends toward a first wheel bearing that is disposed in the hub cavity and that rotatably supports the hub.

15. The wheel end assembly of claim 14 further comprising a tone ring seal that extends around the second tone ring flange and that extends from the second tone ring flange to the hub.

16. The wheel end assembly of claim 15 wherein the tone ring seal extends continuously around the second tone ring flange and the seal.

17. The wheel end assembly of claim 15 wherein the hub extends continuously around the tone ring seal.

18. The wheel end assembly of claim 14 wherein the second tone ring flange extends around a portion of the first wheel bearing.

19. The wheel end assembly of claim 14 further comprising a brake rotor that is fixedly disposed on the hub, wherein the brake rotor extends around the second tone ring flange.

20. A wheel end assembly comprising:
    a spindle that extends around an axis;
    a hub that receives the spindle and is rotatable about the axis with respect to the spindle, wherein the hub has a first hub end surface that is disposed at an end of a first hub mounting flange, a second hub end surface that is disposed opposite the first hub end surface, and a hub cavity that extends from the first hub end surface to the second hub end surface;
    a tone ring that contacts the first hub end surface and that has a tone ring opening that receives the spindle, a first tone ring flange that protrudes from a first side of the tone ring, and a second tone ring flange disposed opposite the first tone ring flange that protrudes from a second side of the tone ring that is disposed opposite the first side, wherein the second tone ring flange extends into the hub cavity;
    a seal that is disposed in the tone ring opening and that extends from the spindle to the first tone ring flange and the second tone ring flange, wherein the seal is spaced apart from and does not engage the hub; and
    a brake rotor that contacts the first hub mounting flange.

* * * * *